United States Patent [19]

Gür et al.

[11] Patent Number: 5,376,469
[45] Date of Patent: Dec. 27, 1994

[54] DIRECT ELECTROCHEMICAL CONVERSION OF CARBON TO ELECTRICAL ENERGY IN A HIGH TEMPERATURE FUEL CELL

[75] Inventors: Turgut M. Gür, Palo Alto; Robert A. Huggins, Stanford, both of Calif.

[73] Assignee: The Board of Trustees of the Leland Stanford Junior University, Stanford, Calif.

[21] Appl. No.: 129,948

[22] Filed: Sep. 30, 1993

[51] Int. Cl.[5] .............................................. H01M 8/12
[52] U.S. Cl. ...................................... 429/17; 429/20; 429/33; 429/218
[58] Field of Search ....................... 429/12, 13, 17, 19, 429/20, 30, 33, 218

[56] References Cited

U.S. PATENT DOCUMENTS

| | | | |
|---|---|---|---|
| 460,122 | 9/1891 | Edison | 429/17 |
| 4,404,068 | 9/1983 | Huggins et al. | 204/59 |
| 4,459,340 | 7/1984 | Mason | 429/13 |
| 4,921,765 | 5/1990 | Gmeindl et al. | 429/17 X |
| 5,232,793 | 8/1993 | Miyauchi et al. | 429/20 X |
| 5,298,340 | 3/1994 | Cocks et al. | 429/13 |

OTHER PUBLICATIONS

Turgut M. Gür and Robert A. Huggins, "Direct Electrochemical Conversion of Carbon to Electrical Energy in a High Temperature Fuel Cell," Journal of Electrochemical Society, vol. 139, No. 10, Oct. 1992, pp. L95-L97.

Turgut M. Gür, Ian D. Raistrick and Robert A. Huggins, "Steady-State D-C Polarization Characteristics of the $O_2$, Pt/Stabilized Zirconia Interface," Journal of Electrochemical Society, vol. 127, No. 12, Dec. 1980, pp. 2620-2628.

"Solid oxide fuel cells to be developed," Chemical & Engineering News, p. 24, Jun. 10, 1991.

"Scaleup slated for ceramic fuel cell," Chemical & Engineering News, p. 21, APr. 28, 1986.

Jack T. Brown, "High Conductivity Solid Ionic Conductors: Recent Trends and Applications," T. Takaha- (List continued on next page.)

Primary Examiner—Anthony Skapars
Attorney, Agent, or Firm—Leo V. Novakoski; Edward J. Radio

[57] ABSTRACT

A high temperature fuel cell (10) having first and second temperature zones (14, 16) for directly converting carbon fuel (12) to electrical energy comprises a first heat source (22), a second heat source (26), and a housing (18) that includes a non-porous section (15) and a solid electrolyte (30) having first and second electrolyte surfaces (32, 34) to which first and second electrodes (36, 38) are electrically connected. The first heat source (26) establishes first temperature zone (14) in the vicinity of the solid electrolyte (30) for adjusting the conductivity of the solid electrolyte (30) and electrodes (36, 38). The second heat source (26) is positioned in the vicinity of non-porous section (15) of housing (18) a distance from first heat source (22) to establish second temperature zone (16). A fuel compartment (20) defined by the first electrolyte surface (32) of solid electrolyte (30) and the non-porous section (15) of housing (18) spans first and second temperature zones (14, 16) to allow intermixing of oxygen provided through solid electrolyte (30) and a carbon fuel (12) which is located primarily in second temperature zone (16). The fuel compartment (20) may be provided with a gas inlet (25), gas outlet (27), and return line (31) through which non-reactive gas can be circulated to enhance the mixing of oxygen with carbon fuel (12). To generate electrical power, second temperature zone (16) is adjusted to a temperature which favors the complete oxidation of carbon fuel (12), first temperature zone (14) is adjusted to a temperature that minimizes the resistance of solid electrolyte (30) and electrodes (36, 38), and oxygen is provided by supplying an oxygen containing gas to the second electrolyte surface (32) of solid electrolyte (30).

27 Claims, 4 Drawing Sheets

OTHER PUBLICATIONS shi (ed.), World Scientific, Singapore, 1989, pp. 630–663 (Month unknown).

J. Weissbart and R. Ruka, "Solid Oxide Electrolyte Fuel Cells," American Chemical Society 140th Meeting in Chicago, vol. II, G. J. Young (ed.), Reinhold Publishing Corp., New York 1963 (Month unknown).

J. Weissbert and R. Ruka, "A Solid Electrolyte Fuel Cell," Journal of Electrochemical Society, vol. 109, No. 8, 1962, pp. 723–726 (Month unknown).

E. Baur and H. Preis, "Über Brennstoff-Ketten Mit Festleitern," Ztschr. Elektrochem, Bd. 43, No. 9, Jun. 1937, pp. 727–732.

D. H. Archer and R. L. Zahradnik, "The Design of a 100–Kilowatt, Coal Burning, Fuel Cell Power System," Chem. Eng. Progr. Symp. Series, No. 75, vol. 63, 1967 pp. 55–62 (month unknown).

B. C. Nguyen, T. A. Lin and D. M. Mason, "Electrocatalytic Reactivity of Hydrocarbons on a Zirconia Electrolyte Surface," Journal of Electrochemical Society, vol. 133, No. 9, pp. 1807–1815, Sep., 1986.

Turgut M. Gür, Excerpts from "Electrochemical Reduction of Oxygen and Nitric Oxide on Stabilzed Zicronia," Dissertation Submitted to the Department of Materials Science and Engineering and the Comittee on Graduate Studies of Stanford University, Apr. 1976.

D. Eng and M Stoukides, "Catalytic and Electrocatalytic Methane Oxidation with Solid Oxide Membranes," Catal. Rev. Sci. Eng. 33 (3&4) p. 375, 1991 (Month unknown).

"Dual design for 'coal-fired' fuel cells," Science News, Nov. 7, 1992, vol. 142, p. 318.

T. M. Gür, I. D. Raistrick and R. A. Huggins, "Ionic Conductivity of 8mol.%$Sc_2O_3$–$ZrO_2$ Measured by Use of Both A.C. and D.C. Techniques," Materials Science and Engineering, vol. 46, 1980, pp. 53–62 (month unknown).

DIRECT ELECTROCHEMICAL CONVERSION OF CARBON TO ELECTRICAL ENERGY IN A HIGH TEMPERATURE FUEL CELL

TECHNICAL FIELD

This invention relates to the field of fuel cells, and in particular to the field of high temperature fuel cells for the direct electrochemical conversion of carbon to electrical energy.

BACKGROUND OF THE INVENTION

High temperature fuel cells employing solid electrolytes to convert the chemical energy stored in gaseous fuels to electrical energy have been reported. In the most common examples of these fuel cells, oxygen is the working medium for electrochemical conversion, moving as oxide ions across the solid electrolyte to react with gaseous fuels such as coal derived gases, $H_2$, and $CH_4$. Electrons consumed in the reduction of oxygen to oxide ions at the cathode side of the electrolyte are released from the oxide ions at the anode side of the electrolyte to generate current flow in an external circuit. These fuel cells operate most efficiently when the gaseous fuels are completely oxidized at the anode to $CO_2$ and $H_2O$ in the case of carbon containing fuels or $H_2O$ in the case of $H_2$. The efficiency of solid oxide fuel cells is also improved by operating them at high temperatures where ohmic losses due to the impedances of the solid electrolyte and the electrode are minimized.

The conversion of the chemical energy to electricity provided by the combustion of gaseous fuels is inherently less efficient than the direct conversion of pure carbon from coal. For example, in the case of $H_2$ and $CH_4$, stable H-H and C-H bonds must be broken before the energy releasing reactions can occur. Consequently, less chemical energy is available to generate electricity than in the case where carbon is oxidized directly.

Attempts have been made to use coal as a carbon source in solid oxide fuel cells. However, in these cases a separate gasification step is employed to convert the coal into a gaseous fuel prior to the combustion process. Typically, this is done by passing wet oxygen ($O_2$ plus $H_2O$) over coal at elevated temperatures to generate CO and $H_2$, and the CO is subsequently reacted with $O_2$ to produce $CO_2$. The combustion of coal using this intermediate conversion process is still less efficient than the direct combustion of coal. For example, the gasification process used to generate CO for electrochemical conversion is a thermal process, and therefore subject to the energy conversion limits of the Carnot cycle. In addition, the primary reaction at the anode of the fuel cell is the oxidation of CO to $CO_2$, which yields approximately half as much chemical energy for conversion to electricity as the oxidation of C to $CO_2$.

Despite the advantages of direct electrochemical conversion of coal to electricity, there are a number of obstacles to producing a practical fuel cell for such purposes. Chief among these obstacles are the competing temperature requirements of the solid electrolyte and the combustion reactions of the fuel cell. For example, carbon can react directly with $O_2$ to generate either CO or $CO_2$, with complete oxidation being favored at lower temperatures (below about 700° C.). On the other hand, the impedances of the solid electrolyte and its electrodes for ionic conduction increase with decreasing temperature. For this reason, solid electrolyte fuel cells are typically run at temperatures above approximately 900° C. As a result, a conventional solid oxide fuel cell could not efficiently convert coal directly to electricity since either the thermodynamic efficiency of the combustion reactions or the conductivity of the electrolyte and electrodes could not be independently optimized.

In sum, it is desirable to develop methods for the direct conversion of solid fuels such as coal into electrical energy, to eliminate the energy and efficiency costs of intermediate gasification steps. However, in order to operate efficiently, a solid fuel cell must address the problems presented by the competing temperature requirements of the electrolyte and fuel cell reactions, as well as the reaction kinetics problems of solid fuel reactants.

DISCLOSURE OF INVENTION

The present invention is a high temperature fuel cell (10) that uses an oxide ion conducting solid electrolyte (30) in conjunction with separate temperate zones (14, 16) to optimize the direct electrochemical conversion of carbon fuels (12) to electrical energy. The high temperature fuel cell (10) of the present invention eliminates the need for an intermediate step in which the carbon fuel (12) is converted into a gaseous fuel prior to combustion. Combustion efficiency is optimized by providing fuel cell (10) with separate temperature zones (14, 16) for the carbon fuel (12) and the solid electrolyte (30), respectively, allowing simultaneous and independent control of the reactions which drive the electrochemical process and the ionic conductivity of the solid electrolyte (30).

In accordance with the present invention, a high temperature fuel cell (10) comprises a first heat source (22), a second heat source (26), and housing (18), which includes a non-porous section (15) and a solid electrolyte (30). The solid electrolyte (30) has first and second electrolyte surfaces (32, 34) on which are deposited first (anode) and second (cathode) electrodes (36, 38), respectively, for conducting currents generated by high temperature fuel cell (10). The first heat source (22) is located in the vicinity of solid electrolyte (30) of housing (18) to establish a first temperature zone (14) of fuel cell (10). The second heat source (26) is positioned in the vicinity of the non-porous section (15) of housing (18) at a location that is removed from first heat source (22), to establish a second temperature zone (16) in fuel cell (10). A fuel compartment (20) which communicates between the first and second temperatures zones (14, 16) is formed in housing (18) by the non-porous section (15) and the first electrolyte surface (32) of solid electrolyte (30). The fuel compartment (20) includes a gas inlet (25) and may include a liquid seal (24) for adjusting the pressure in the fuel compartment (20).

Electrical power is generated from the high temperature fuel cell (10) by placing carbon fuel (12) in the second temperature zone (16) of the fuel compartment (20) and heating the carbon fuel (12) to a temperature that favors complete oxidation of the carbon fuel (12) to $CO_2$. First temperature zone (14) is adjusted by means of first heat source (22) to a temperature at which ohmic losses due to the impedances of the solid electrolyte (30) and electrodes (36, 38) are minimized. Oxygen is then provided to the carbon fuel (12) by supplying an oxygen containing gas to the second electrode (38) of the solid electrolyte (30), the driving force for conduction of oxide ions through the solid electrolyte (30) being provided by the difference between the activities of oxygen in the fuel compartment (20) and in the oxygen containing gas supplied to the second electrode (38).

A high temperature fuel cell (60) may be implemented for commercial purposes using a fluidized bed reactor (50) for the fuel compartment (20). In a fluidized bed reactor (50), fine particles of carbon fuel (12) are suspended by blowing a non-reactive gas in through the bottom (52) of the reactor (50). Second heat sources (26) are located along the outer surface of the reactor (50) to maintain the carbon fuel (12) at the desired temperature. A collection of solid electrolytes (30), each having an electrode pair (36, 38) as described above, is arrayed along the reactor (50) in a temperature zone controlled by first heat sources (22). Oxygen containing gases supplied to the second electrodes (38) of these solid electrolytes (30) provide oxygen to the suspended carbon particles (12) in a manner analogous to that described for a single fuel cell (10).

DETAILED DESCRIPTION OF THE PREFERRED EMBODIMENTS

Figure 1A:
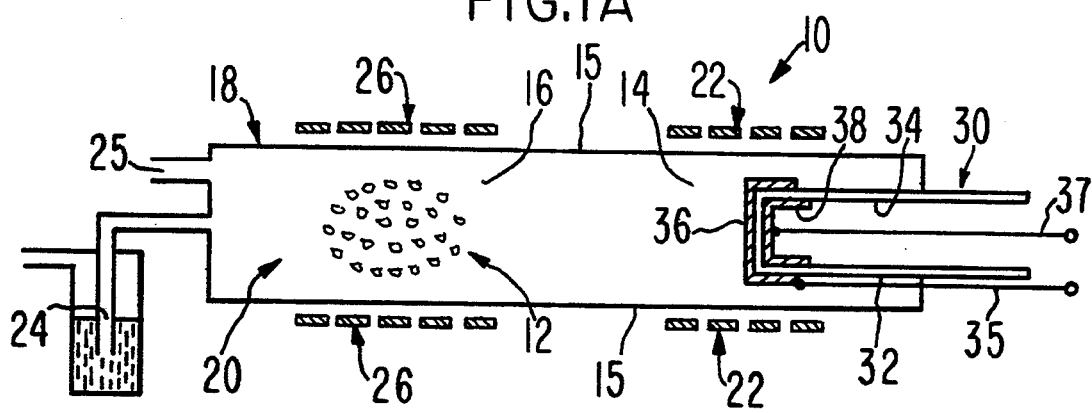
FIG. 1A is a diagram of a cross-section of one embodiment of a high temperature fuel cell (10) in accordance with the present invention.

Referring to FIG. 1A, there is shown a high temperature fuel cell 10 for efficiently converting the chemical energy of carbon directly into electrical energy by electrochemical means fuel cell 10 comprises a first heat source 22, a second heat source 26, and a housing 18 which includes a non-porous section 15 and a solid electrolyte 30. Solid electrolyte 30 has a first electrolyte surface 32 which is in electrical contact with a first electrode 36, and a second electrolyte surface 34 which is in electrical contact with a second electrode 38. Electrical connections 35, 37 are in electrical contact with first and second electrodes 36, 38, respectively, for conducting electrical current generated by fuel cell 10.

First heat source 22 is positioned in the vicinity solid electrolyte 30 to establish a first temperature zone 14 in the vicinity of solid electrolyte 30. Second heat source 24 is located in the vicinity of non-porous section 15 at some distance removed from first heat source 22 to establish a second temperature zone 16. First and second heaters 22, 26 may be for example resistive heating elements or radiative heaters arrayed circumferentially around housing 18. First and second temperature zone 14, 16 are not sharply defined, but rather gradually merge one into the other. Non-porous section 15 of housing 18 and first electrolyte surface 32 of solid electrolyte 30 together define a fuel compartment 20, which spans first and second temperature zones 14, 16 so that oxygen from solid electrolyte 30 and carbon fuel 12 may pass freely between first and second temperature zones 14, 16. In general, the geometry of fuel cell 10 and the relative sizes of first and second temperature zones 14, 16 are selected so that the temperature of carbon fuel 12 is determined primarily by the temperature of second temperature zone 16. In one embodiment of fuel cell 10 a gas inlet 25 and a liquid seal 24 may be provided for purging fuel compartment 20 and maintaining the pressure in fuel compartment 20 at a constant level during combustion.

In the embodiment shown in FIG. 1A, solid electrolyte 30 has a cylindrical shape and extends into non-porous section 15 so that first electrode 36 at closed end 40 is within first temperature zone 14 and proximate to second temperature zone 16. An oxygen containing gas such as air or pure oxygen is supplied to second electrode 38 of solid electrolyte 30, where it is oxidized and transported across solid electrolyte 30 to first electrode 26 as oxide ions. At first electrolyte 36, oxygen is regenerated by reduction of the oxide ions, and made available for combustion by carbon fuel 12 in fuel compartment 20. The geometry of solid electrolyte 30 in FIG. 1A enhances the intermixing of oxygen provided through solid electrolyte 30 with carbon fuel 12.

Figure 1B:
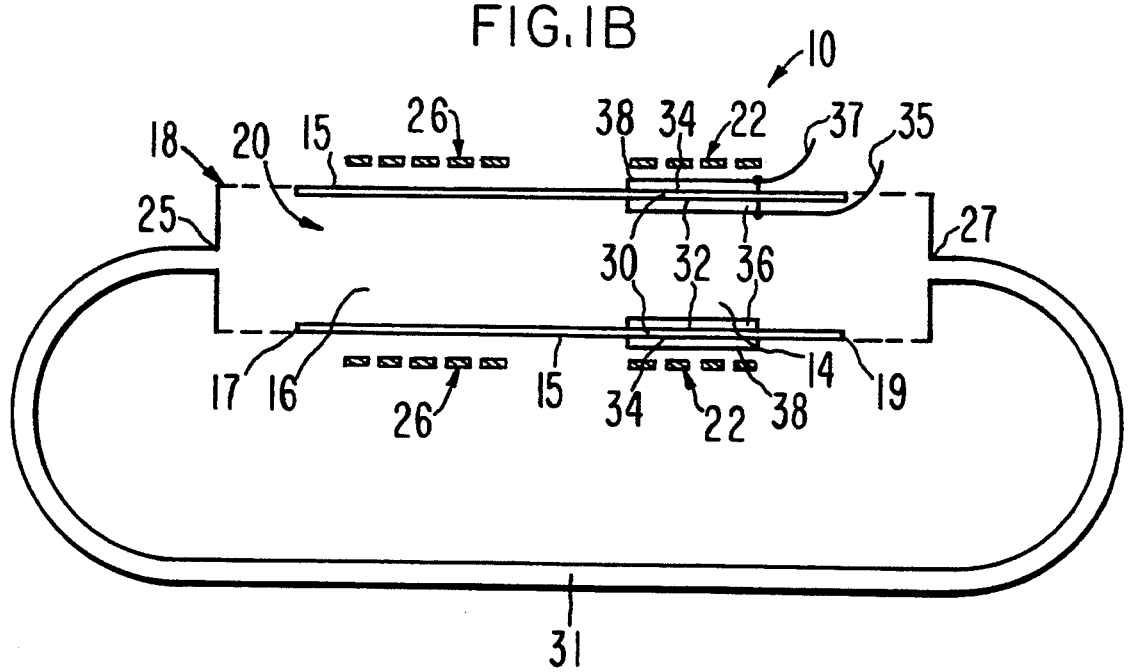
FIG. 1B is a diagram of a cross section of another embodiment of a high temperature fuel cell (10) in accordance with the present invention.

Referring now to FIG. 1B, there is shown an alternative embodiment of high temperature fuel cell 10, wherein solid electrolyte 30 and housing 18 together form an elongated fuel cell 10. Oxygen is provided to carbon fuel 12 by supplying an oxygen containing gas to solid electrolyte 30, where its oxidation and reduction at second and first electrodes 38, 36, respectively, generates electrical current which is collected by connections 35, 37. A Non-reactive gas such as for example $CO_2$, $N_2$, Ar, or He entering fuel cell 10 at first end 17 of housing 18 may be used to entrain carbon fuel 12 in second temperature zone 16 and transport it toward solid electrolyte 30 for reaction with oxygen. Non-reactive gas and any unreacted carbon fuel 12 or oxygen will exit temperature fuel cell 10 at second end 19 of housing 18.

Alternatively, a return line 31 may be provided to allow for recirculation of reactants through temperature fuel cell 10. In the embodiment of FIG. 1B, a non-reactive gas enters fuel compartment 20 through gas inlet 25, and exits through gas outlet 27, where it is recirculated by return line 31 back to gas inlet 25. This arrangement allows oxygen from solid oxide 30 in first temperature zone 14 to be entrained in the stream of non-reactive gas and passed through return line 31 to second temperature zone 16 for reaction with carbon fuel 12. It also minimizes the amount of carbon fuel 12 that is left unconsumed by fuel cell 10. Other fuel cells 10, in which the geometries of non-porous section 15 and solid electrolyte 30 are selected to enhance the mixing of oxygen and carbon fuel 12, may be contemplated within the scope of the present invention.

Non-porous section 15 provides structural support for solid electrode 30 and together with solid electrolyte 30 forms fuel compartment 20. Non-porous section 15 may be selected from among refractory materials that are oxidation and reduction resistant and that do not display the mixed electronic and ionic conducting properties discussed below. For example, non-porous section 15 may be a ceramic material or an oxidation resistant metal or alloy.

Ideally, solid electrolytes 30 for use in fuel cells 10 in accordance with the present invention are ionic conductors and electronic insulators, since the greater conductivity of electrons would otherwise effectively eliminate any charge conduction by oxide ions. Suitable solid electrolytes 30 may be generated for example by doping the oxides of Bi, Zr, Hf, Th, and Ce with either alkaline earth oxides such as CaO or MgO, or rare-earth oxides such as $Sc_2O_3$, $Y_2O_3$, or $Yb_2O_3$. Solid electrolytes are discussed below in conjunction with the temperature dependence of their conductivities.

Second electrode 38, the cathode of fuel cell 10, provides a pathway for the electrons necessary to reduce oxygen to oxide ions for transport across solid electrolyte 30. First electrode 36, the anode of fuel cell 10, provides a pathway to conduct away electrons released by the oxidation of oxide ions. Oxygen is provided to second electrolyte surface 34 of solid electrolyte 30 by directing either an oxygen-containing gas or pure oxygen at electrode 38, where the oxygen is reduced to oxide ions. Electrode 38 must thus allow the mass transport of oxygen in the form of oxide ions between the oxygen-containing gas and second electrolyte surface 34 of solid electrolyte 30. Similarly, electrode 36 must allow oxide ions to pass from first electrolyte surface 32 of solid electrolyte 30 into electrode 36 to be oxidized. Since metals are not generally good ionic conductors, electrodes 36, 38 are typically made by applying a porous metallic paste to first and second electrode surfaces 32, 34 of solid electrolyte 30. In a preferred embodiment of the invention, the porous metallic paste is made from an oxidation resistant metal such as a noble metal. For example, when a porous platinum paste is used to make electrode 38, the reduction of molecular oxygen to oxide ions occurs at three phase line boundaries where solid electrolyte 30, electrode 38, and the oxygen-containing gas all come into direct contact. This three phase coincidence of materials is necessary since the poor ionic conductivity of metal electrode 38 requires that reduction of oxygen occurs where solid electrolyte 30 is available to conduct away the resulting oxide ions. The use of porous platinum for electrodes 36, 38 maximizes the number of three phase line boundaries available for mass transport of oxygen.

In a more preferred embodiment of the invention, electrode 38 is made from a mixed conducting oxide material, since such materials are capable of conducting both oxide ions and electronic species (electrons or holes). In this way, first and second electrolyte surfaces 32, 34 can be completely coated with mixed conducting oxide electrodes 36, 38, respectively. The mixed conducting properties of the oxide allows electrodes 36, 38 to conduct not only the electrons necessary for the reduction/oxidation reactions but also to conduct the oxide ions to and from the underlying solid electrolyte 30. Suitable mixed conducting oxide materials may be selected from a variety of oxides, including those having perovskite, pyrochlore, sheelite, and rutile structures. For example, mixed conducting perovskites may be selected from compositions having the formulas:

$$La_{1-x}Sr_xMnO_3 \qquad \text{(Eq. I)},$$

where x is between zero and one, or:

$$La_{1-x}Sr_xCo_yFe_{1-y}O_3 \qquad \text{(Eq. II)},$$

where x is between zero and one, and y is also between zero and one.

In order to operate fuel cell 10 efficiently, two principal means of energy loss must be effectively controlled. These are the incomplete oxidation of carbon fuel 12 and the ohmic losses created by transporting oxide ions across solid electrolyte 30 and electrodes 36, 38 having finite impedances. In the first case, less oxygen is consumed and less energy is generated for conversion to electricity when carbon fuel 12 is incompletely oxidized. In the second case, additional energy generated by electrochemical conversion of carbon fuels 12 is consumed in moving charges through solid electrolyte 30. Temperature zones 14, 16 created by heat sources 22, 26 provide means to optimize operation of fuel cell 10 in view of these inefficiencies.

In the simplest case of a pure carbon fuel 12, combustion occurs by two different reactions. These reactions are the partial oxidation of carbon to CO:

$$C + \tfrac{1}{2}O_2 \rightarrow CO \qquad \text{(Eq. III)},$$

and the complete oxidation of carbon to $CO_2$:

$$C + O_2 \rightarrow CO_2 \qquad \text{(Eq. IV)}.$$

If carbon fuel 12 contains hydrogen and for example sulfur impurities, water and oxides of sulfur are also produced during oxidation. More generally, carbon fuels 12 such as coal may contain volatile impurities such as hydrogen and hydrocarbon compounds in addition to sulfur and ash. While many of these impurities can be removed by coking or desulfurization pretreatments, fuel cells 10 in accordance with the present invention may use untreated coal as carbon fuel 12, the combustible impurities being oxidized along with carbon fuel 12.

The reaction of Eq IV is preferred since it consumes more oxygen and makes available more chemical energy for conversion to electrical current. However, both reactions will occur during combustion of carbon fuel 12, and the degree to which the reaction of Eq. IV predominates over the reaction of Eq. III depends in part on the temperature at which the reactions occur.

Figure 2:
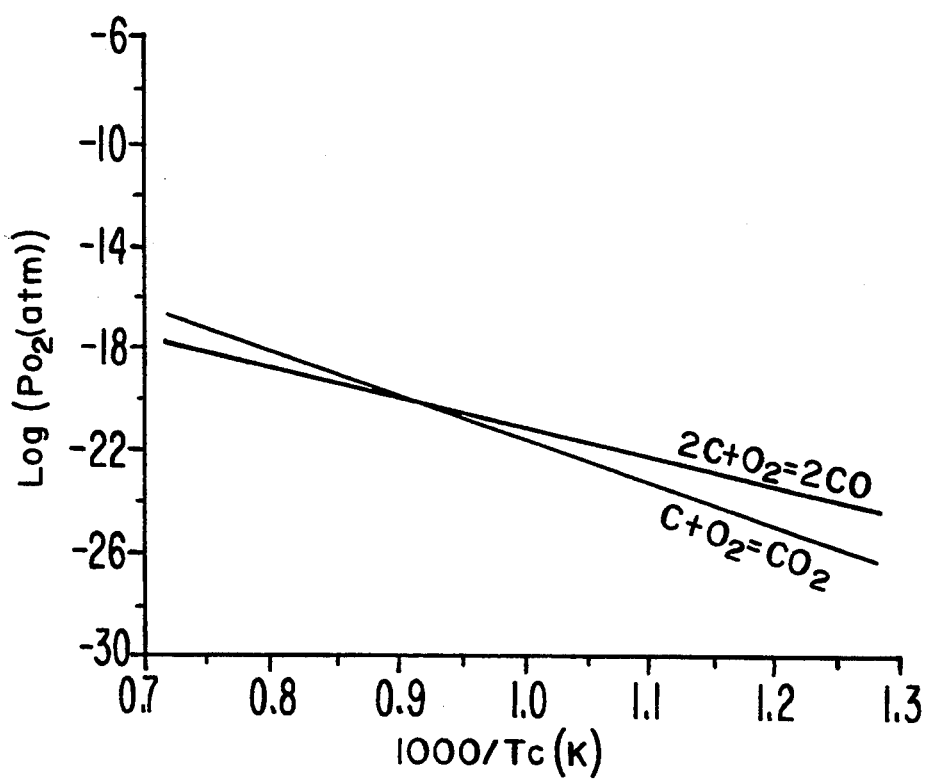
FIG. 2 is a diagram of the theoretical activities of oxygen as a function of temperature for the partial and complete oxidation of a carbon fuel (12).

Referring to FIG. 2, there is shown a graph of the theoretical activity of $O_2$ as a function of the reaction temperature for the reactions of Eq. III and IV. The lower the activity (partial pressure) of $O_2$, the greater the tendency of reaction to proceed to completion (product formation). It is clear from the curves of FIG. 2 that the reaction of Eq. IV is favored at temperatures below about 1000° K. (approximately 700° C.) and that the predominance of the reaction of Eq. IV over the reaction of Eq. III increases as the temperature of the reactants is decreased. Thus, combustion of carbon fuel 12 to completion will be more favored thermodynamically the more the reactant temperatures are reduced below about 700° C. However, the temperature of fuel compartment 20 must still be kept high enough so that the reaction of Equation IV proceeds at a reasonable rate. Thus, in the preferred embodiment of the present invention, the reactants are maintained at about 700° C. by using heat source 22 to adjust the temperature of fuel compartment 20.

Another factor affecting the rates of reaction of Eqs. III and IV is the amount of carbon available to react with the $O_2$. Where carbon is the limiting reactant in the combustion of carbon fuel 12 as may be the case where a solid carbon fuel 12 is used, $O_2$ will be in excess. Consequently, the activity of the $O_2$ increases, decreasing the chemical driving force that generates electric current. This effect can be countered by making a solid carbon fuel 12 available to $O_2$ in a more reactive form. For example, it is known that graphite is more reactive at its edges than it is at the flat surfaces of the graphite sheets. Thus, where carbon fuel 12 is in the form of a solid carbon such as coal or graphite, it is preferably provided in the form of a finely divided powder.

The second factor that may reduce the efficiency of fuel cell 10 is the ohmic loss attributable to the conduction of oxide ions through solid electrolyte 30 and electrodes 36, 38. Solid electrolytes 30 having sufficient ionic conductivities for use in fuel cells 10 may be obtained for example by doping oxides of Bi, Zr, Hf, Th, and Ce with either alkaline earth oxides such as CaO or MgO, or a rare-earth oxide such as $Sc_2O_3$, $Y_2O_3$, or $Yb_2O_3$. The actual ionic conductivities of solid electrolyte 30 will depend on the temperature at which solid electrolyte 30 is maintained. For example, the ionic conductivity of $ZrO_2$ stabilized by $Sc_2O_3$ increases from approximately 0.01 $\Omega^{-1}$ cm$^{-1}$ at 650° C. to approximately 0.1 $\Omega^{-1}$ cm$^{-1}$ at 900° C. Consequently, fuel cells 10 operated at about 650° C. will have ohmic losses due to $I^2R$ heating that are approximately an order of magnitude greater than fuel cells 10 operated at 900° C. making it more efficient to operate at higher temperatures. Where solid electrolyte 30 is $Y_2O_3$ stabilized $ZrO_2$, fuel cell 10 is typically operated at temperatures above about 800° C. This is accomplished in fuel cells 10 of the present invention by using first heat source 22 to adjust first temperature zone 14 around solid electrolyte 30.

Figure 3:
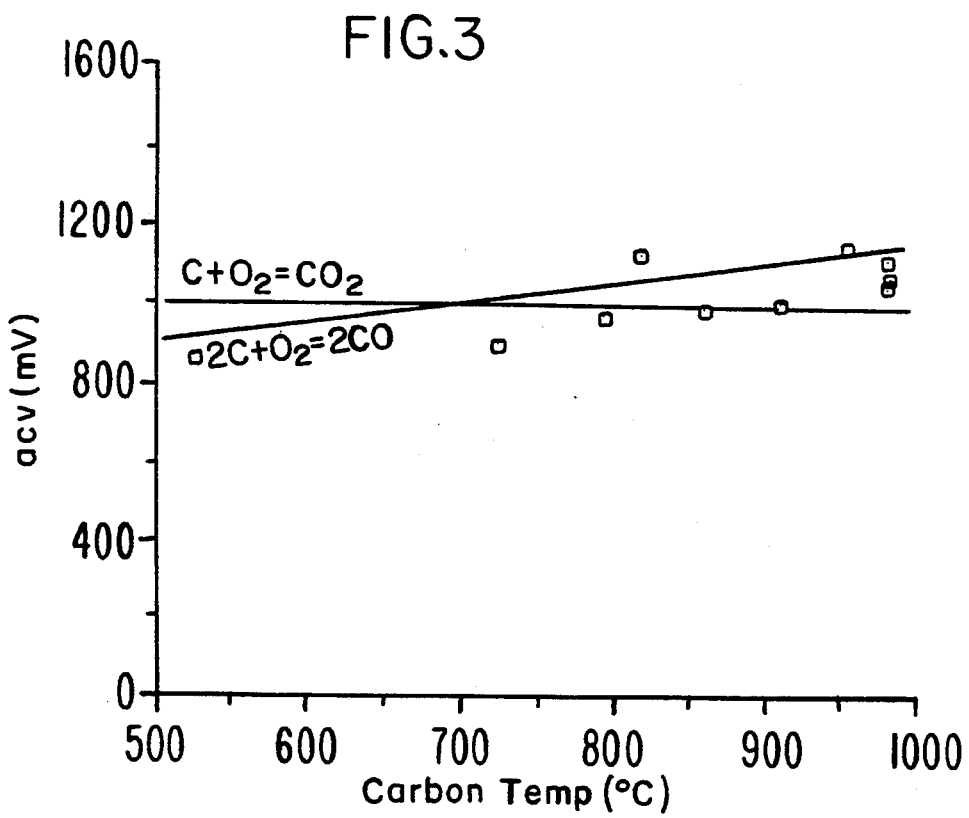
FIG. 3 is a diagram of the expected and measured (squares) open circuit voltages generated between the electrodes (36, 38) of the high temperature fuel cell (10) of FIG. 1A as a function of the temperature of the carbon fuel (12).

Referring now to FIG. 3, there is shown a diagram of the theoretical and measured (squares) open circuit voltages for fuel cell 10 of FIG. 1A, generated with solid electrolyte 30 as a function of temperature. It is clear from the curves of FIG. 3 that the complete oxidation of carbon is a more efficient means of producing electrical energy than the partial oxidation, since the complete oxidation reaction generates comparable open circuit voltages while consuming twice as much oxygen as the partial oxidation reaction. Since the power output of fuel cell 10 is the product of the voltage and current generated, optimizing the temperature of temperature zone 16 for complete oxidation of carbon fuel 12 enhances the efficiency of fuel cell 10.

Figure 4:
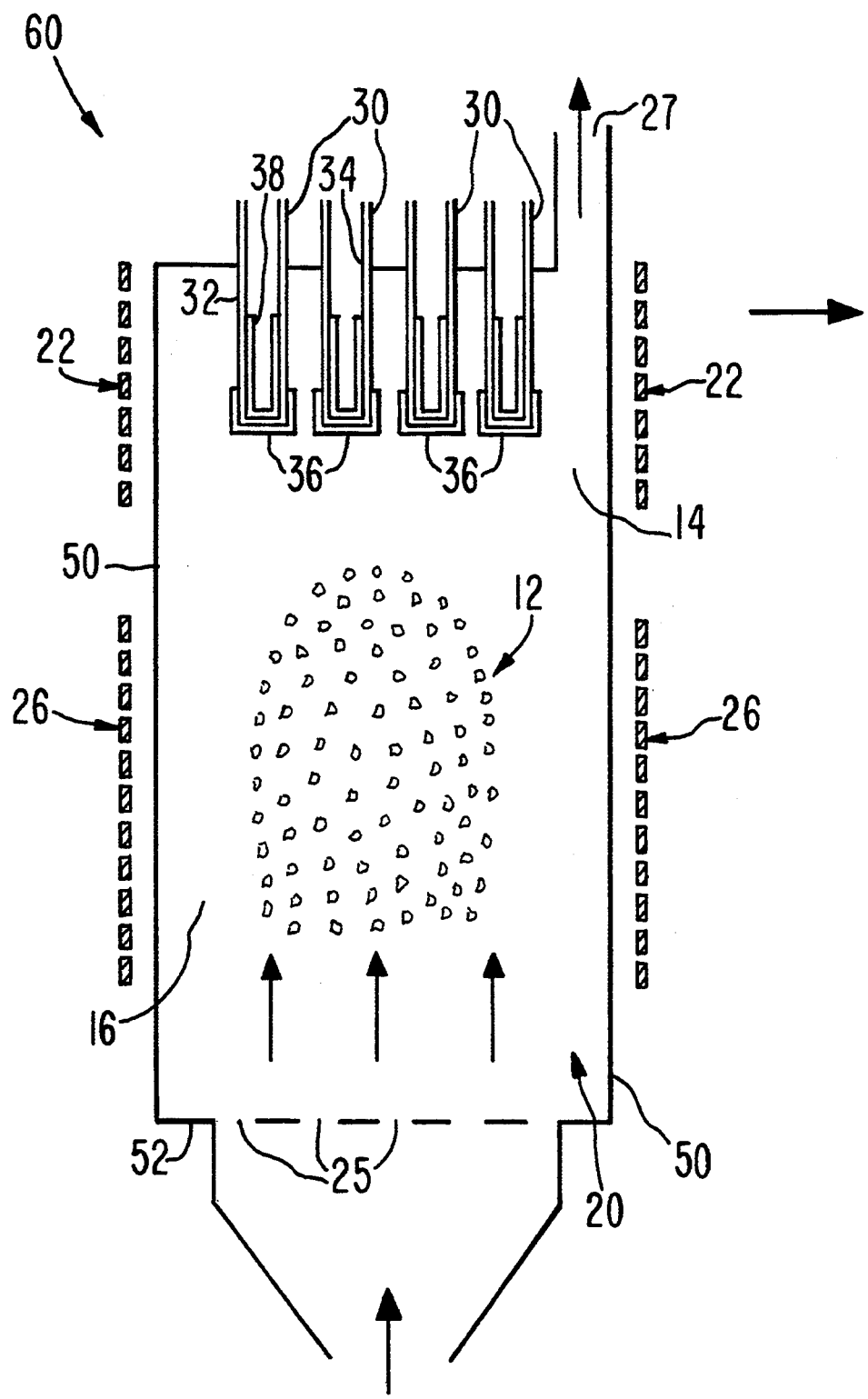
FIG. 4 is a diagram of a high temperature fuel cell (60) in accordance with the present invention where the non-porous section (15) of housing (18) is a fluidized bed reactor (50).

Fuel cells 10 may be modified to generate electricity on a commercial scale by using a fluidized bed reactor 50 as non-porous section 15 of housing 18. Referring now to FIG. 4, there is shown a fuel cell 60 comprising a fluidized bed reactor 50 having a collection of solid electrolytes 30 mounted in a wall 56. Each of solid electrolytes 30 has first and second electrolyte surfaces 32, 34 which are in electrical contact with first and second electrodes 36, 38, respectively. Electrodes 36, 38 from each solid electrolyte 30 may be connected in series or in parallel, according to the use to which fuel cell 60 is applied.

Fluidized bed reactor 50 includes a bottom surface 52 having gas inlets 25. In operation, fine particles of carbon fuel 12 are introduced into fuel compartment 20 of fluidized bed reactor 50. A stream of non-reactive gas is blown in through gas inlets 25 to distribute fine particles of carbon fuel 12 throughout fuel compartment 20. A gas outlet 27 allows the pressure of non-reactive gas in fuel compartment 20 to be controlled. As in fuel cell 10, fuel cell 60 includes first heat source 22 for adjusting temperature zone 14 in the vicinity of solid electrolytes 30 and second heat source 26 for adjusting the temperatures of carbon fuel 12.

Figure 5:
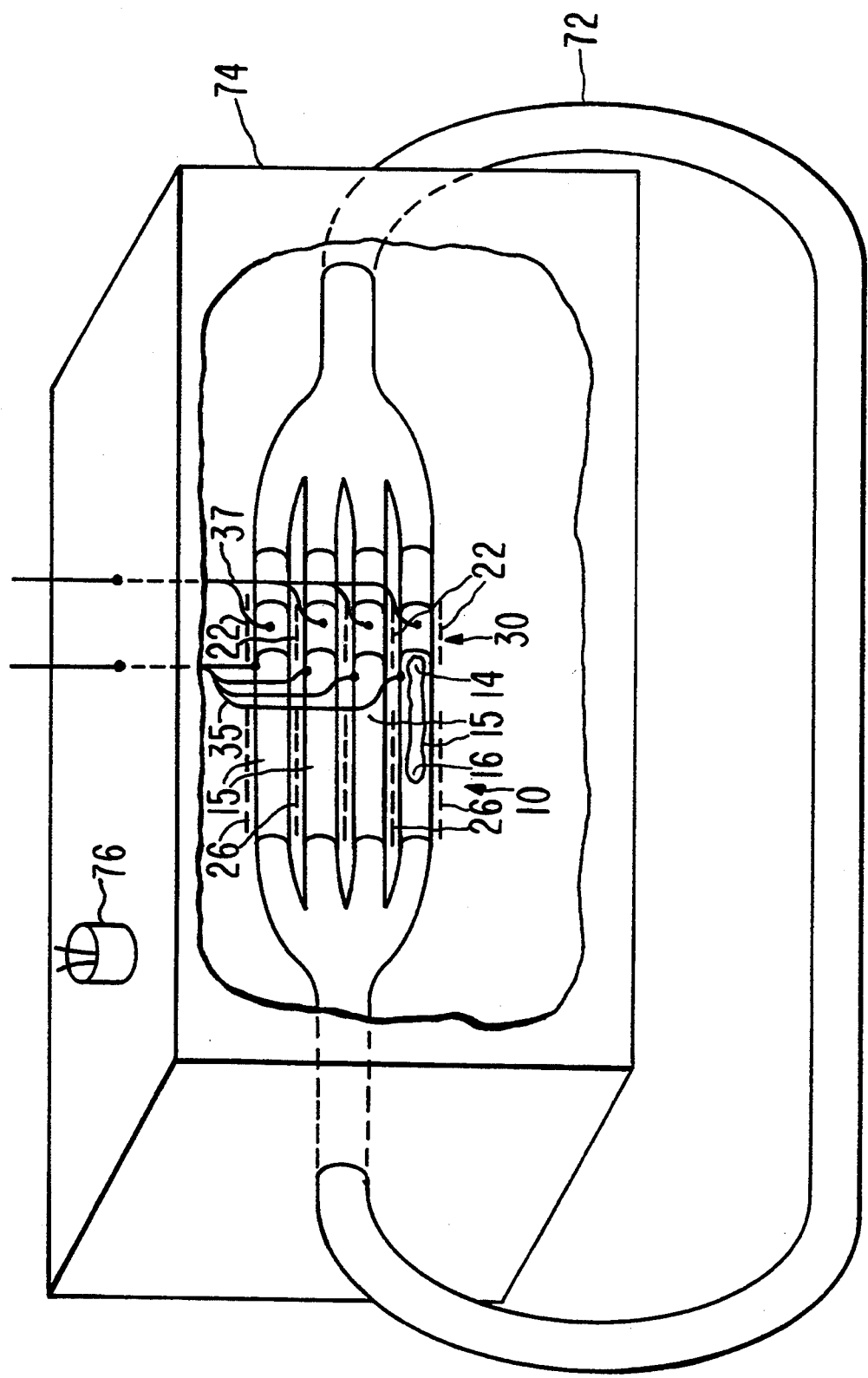
FIG. 5 is a diagram of a high temperature fuel cell (70) in accordance with the present invention comprising a collection of high temperature fuel cells (10) positioned in a container vessel (74).

Referring now to FIG. 5, there is shown a fuel cell 70 comprising a collection of fuel cells 10 as shown in FIG 1B. As shown, fuel cell 70 has a gas line 72 for recirculating a non-reactive gas through fuel cells 10, to maximize mixing of carbon fuel 12 and oxygen form solid electrolytes 30 and minimize loss of uncombusted carbon fuel 12. A gas inlet 76 allows an oxygen containing gas to be introduced into a container vessel 74, where it is provided to solid electrolytes 30. First and second heat sources 22, 26 establish first and second temperature zone 14, 16 for solid electrolytes 30 and carbon fuel 12. Electrical leads 35, 37 from first and second electrolyte surfaces 36, 38, respectively, of solid electrolytes 30 are connected to sum the current generated by individual fuel cells 10 and provide more power.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A high temperature fuel cell having two temperature zones for directly converting a carbon fuel to electrical energy, the fuel cell comprising:

a housing including a non-porous section and a solid electrolyte, the solid electrolyte having first and second electrolyte surfaces to which first and second electrodes, respectively, are attached, the second electrolyte surface and the non-porous. electrically conducting section forming a fuel compartment;

a first heat source positioned on the housing proximate to the solid electrolyte for establishing a first temperatures zone in the fuel compartment in the vicinity: of the solid electrolyte; and a second heat source positioned on the housing at a distance removed from the first heat source for establishing a second temperature zone in the fuel compartment; whereby electrical current is electrochemically generated by the mass transport of oxygen across the solid electrolyte for the combustion of the carbon fuel in the fuel compartment when an oxygen containing gas is brought into contact with the outer surface of the solid electrolyte.

2. The high temperature fuel cell of claim 1, wherein the solid electrolyte is an oxide ion conducting solid electrolyte.

3. The high temperature fuel cell of claim 2, wherein the oxide ion conducting solid electrolyte is selected from the group comprising the oxides of Hf, Zr, Bi, Ce, and Th doped with oxides from the group comprising alkaline earth metals and rare earth metals.

4. The high temperature fuel cell of claim 3, wherein the oxide ion solid electrolyte is zirconium oxide doped with yttrium oxide.

5. The high temperature fuel cell of claim 1, wherein the first and second electrodes are each formed from a porous, oxidation resistant metal.

6. The high temperature fuel cell of claim 5, wherein each porous, oxidation resistant metals is a noble metal.

7. The high temperature fuel cell of claim 1, wherein the first and second electrodes are each formed from a mixed conducting oxide.

8. The high temperature fuel cell of claim 7, wherein the mixed conducting oxide is selected from the group of materials having rutile, perovskite, pyrochlore, and sheelite structures.

9. The high temperature fuel cell of claim 8, wherein the mixed conducting oxide has a perovskite structure and a composition having the formula $La_{1-x}Sr_xMnO_3$, where x is between zero and one.

10. The high temperature fuel cell of claim 8, wherein the mixed conducting oxide has a perovskite structure and a composition having the formula $La_{1-x}Sr_xCo_yFe_{1-y}O_3$, where x is between zero and approximately one and y is between zero and approximately one.

11. The high temperature fuel cell of claim 1, wherein the temperature of the solid electrolyte is adjusted to between approximately 700° C. and approximately 1100° C.

12. The high temperature fuel cell of claim 11, wherein the temperature of the carbon fuel is adjusted to between approximately 500° C. and approximately 1000° C.

13. The high temperature fuel cell of claim 12, wherein the temperature of the carbon fuel is adjusted to between approximately 500° C. and approximately 800° C.

14. A high temperature fuel cell according to claim 1, wherein a gas inlet line and a liquid seal are attached to the fuel compartment, for adjusting the pressure in the fuel compartment.

15. A high temperature fuel cell according to claim 1, wherein a gas inlet and an gas outlet coupled together by a return line are each attached to the fuel compartment, for circulating a non-reactive gas through the fuel compartment to enhance the combustion of the carbon fuel.

16. A method for directly converting carbon fuels to electrical energy using a high temperature fuel cell having a housing that includes a fuel compartment defined by a non-porous section and a solid electrolyte having first and second electrolyte surfaces to which first and second electrodes are electrically connected, the fuel cell also having separately adjustable first and second temperature zones for independently controlling the temperature of the solid electrolyte and a carbon fuel within the fuel compartment, the method comprising the steps of:
   adjusting the first temperature zone to a temperature that minimizes the impedances of the solid electrolyte and electrodes;
   adjusting the second temperature zone to a temperature at which complete oxidation of the carbon fuel to $CO_2$ is favored over its oxidation to CO;
   supplying an oxygen containing gas to the second electrolyte surface of the solid electrolyte; and
   drawing electrical current from the first and second electrodes.

17. The method of claim 16, wherein the oxygen containing gas is a gas having a high oxygen activity.

18. The method of claim 17, wherein the oxygen containing gas having a high oxygen activity is selected from the group comprising oxygen and air.

19. The method of claim 18, wherein the first temperature zone is adjusted to a temperature of between approximately 700° C. and 1100° C.

20. The method of claim 18, wherein the second temperature zone is adjusted to a temperature of between approximately 500° C. and approximately 1000° C.

21. The method of claim 18, wherein the solid electrolyte is an oxide ion conducting solid electrolyte selected from the group comprising the oxides of Bi, Zr, Bi, Ce, and Th doped with oxides from the group comprising the alkaline earth oxides and rare earth oxides.

22. The method of claim 21, wherein the oxide ion conducting solid electrolyte is yttrium-stabilized zirconium oxide.

23. The method of claim 18, wherein the carbon fuel comprises fine particles of carbon fuel for providing greater surface area and enhanced rates of oxidation.

24. The method of claim 18, wherein the carbon fuel is coal.

25. The method of claim 24, wherein the coal is untreated.

26. The method of claim 18, wherein the first and second electrodes are mixed conducting oxides.

27. The method of claim 25, wherein the mixed conducting oxides are selected from the group of materials having rutile, perovskite, pyrochlore, and sheelite structures.

* * * * *